(12) United States Patent
Luly et al.

(10) Patent No.: US 7,141,094 B2
(45) Date of Patent: Nov. 28, 2006

(54) AZEOTROPE-LIKE COMPOSITIONS OF IODINE HEPTAFLUORIDE AND HYDROGEN FLUORIDE

(75) Inventors: Matthew H. Luly, Hamburg, NY (US); George R. Cook, Buffalo, NY (US); Rajiv R. Singh, Getzville, NY (US)

(73) Assignee: Honeywell International Inc., Morristown, NJ (US)

( * ) Notice: Subject to any disclaimer, the term of this patent is extended or adjusted under 35 U.S.C. 154(b) by 567 days.

(21) Appl. No.: 10/701,574

(22) Filed: Nov. 5, 2003

(65) Prior Publication Data

US 2005/0096247 A1    May 5, 2005

(51) Int. Cl.
*B01D 57/68* (2006.01)
(52) U.S. Cl. ........................................ 95/190
(58) Field of Classification Search ............ None
See application file for complete search history.

(56) References Cited

U.S. PATENT DOCUMENTS

| | | | |
|---|---|---|---|
| 3,928,821 A * | 12/1975 | Gregg et al. ............. | 372/89 |
| 5,182,040 A | 1/1993 | Bartlett et al. ............. | 252/67 |
| 5,362,350 A | 11/1994 | Yanagida .................... | 156/643 |
| 5,648,017 A | 7/1997 | Bartlett et al. ............. | 252/67 |
| 6,147,006 A | 11/2000 | Mouri et al. | |
| 6,749,717 B1 * | 6/2004 | Sandhu et al. ......... | 156/345.35 |

FOREIGN PATENT DOCUMENTS

| WO | WO 02/098529 | | 12/2002 |
|---|---|---|---|
| WO | WO 2005/044726 | * | 5/2005 |

OTHER PUBLICATIONS

Rogers, M., Spiers, J., Parrish, M. Thompson, H. Journal of the American Chemical Society, vol. 78, p. 936 (1956).

* cited by examiner

*Primary Examiner*—John R. Hardee
(74) *Attorney, Agent, or Firm*—Erika S. Wilson

(57) ABSTRACT

Provided are azeotrope-like compositions comprising iodine heptafluoride and hydrogen fluoride and uses thereof, including methods for separating iodine heptafluoride or hydrogen fluoride from a mixture comprising iodine heptafluoride and hydrogen fluoride by removing an azeotrope-like composition of the present invention therefrom.

17 Claims, 1 Drawing Sheet

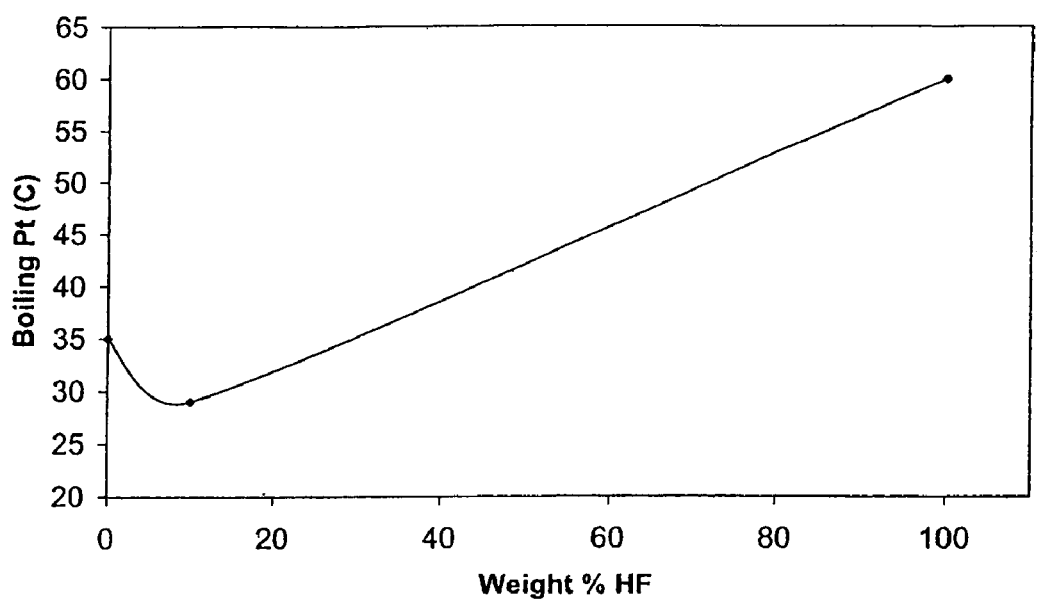

ically-varying composition, depending on the temperature and/or pressure.

AZEOTROPE-LIKE COMPOSITIONS OF IODINE HEPTAFLUORIDE AND HYDROGEN FLUORIDE

FIELD OF THE INVENTION

The present invention provides azeotrope-like compositions of iodine heptafluoride and hydrogen fluoride, fluorinating agents comprising such azeotrope-like compositions, and methods of producing relatively pure iodine heptafluoride and/or relatively pure hydrogen fluoride by removing the present azeotrope-like compositions from a mixture of iodine heptafluoride and hydrogen fluoride.

BACKGROUND

Iodine fluorides, compounds consisting of iodine and fluorine, have found widespread use in a variety of applications. For example, iodine heptafluoride ("$IF_7$") and iodine pentafluoride ("$IF_5$") have been used as fluorinating agents, compositions capable of providing reactive fluoride ions to compounds to be fluorinated, in numerous applications. The difference in fluorinating activity between $IF_7$ and $IF_5$ ($IF_7$ tends to be a more active fluorinating agent than $IF_5$) offers some versatility in the ability to select one of such fluorinating agents over the other for a given use, depending on the strength of fluorinating activity required. Nevertheless, applicants have recognized that other compositions, including compound mixtures comprising iodine fluorides, are desirable as alternatives for $IF_7$ or $IF_5$, for example, in applications requiring fluorinating agents of varying strengths.

BRIEF DESCRIPTION OF THE DRAWING

FIG. 1 is a graphical depiction of a boiling point curve for compositions comprising $IF_7$ and hydrogen fluoride.

DESCRIPTION OF PREFERRED EMBODIMENTS

The present inventors have developed several compositions that help to satisfy the continuing need for alternatives to iodine heptafluoride ("$IF_7$") and iodine pentafluoride ("$IF_5$") in a variety of applications, including use as alternative fluorinating agents. In one embodiment, the present invention provides azeotrope-like compositions comprising $IF_7$ and hydrogen fluoride ("HF") suitable for use in a variety of applications, including as fluorinating agents.

Applicants have recognized surprisingly that $IF_7$ and HF can be mixed to form the azeotrope-like compositions of the present invention. Accordingly, in another embodiment, the present invention provides methods for producing an azeotrope-like composition comprising combining $IF_7$ and HF in amounts effective to produce an azeotrope-like composition.

Applicants have further discovered that the azeotrope-like compositions of the present invention are useful in the production of relatively pure $IF_7$ or HF from mixtures comprising $IF_7$ and HF. Both $IF_7$ and HF find use individually in a variety of applications, many of which require the use of $IF_7$ and/or HF having a relatively high purity. For example, the use of high purity $IF_7$ in the manufacture of semiconductors is disclosed in U.S. Pat. No. 5,362,350, which patent is incorporated herein by reference. While commercial methods of preparing $IF_7$ tend to produce product mixtures further comprising HF, which tends to be difficult to remove from the $IF_7$ product mixtures, applicants have recognized that the azeotrope-like compositions of the present invention can be used advantageously in methods for removing HF from a mixture comprising $IF_7$ and HF to produce a product enriched in $IF_7$.

Accordingly, in another embodiment, the present invention provides methods of producing a product enriched in $IF_7$ from a mixture comprising $IF_7$ and HF, the method comprising: providing a mixture comprising $IF_7$ and HF in an amount less than the azeotropic amount and removing an azeotrope-like composition of the present invention from the mixture to produce a product enriched in $IF_7$. As used herein, the term "enriched" refers to a composition produced according to the present methods in which the concentration of either the $IF_7$ or HF component is higher relative to its concentration in the provided mixture. A product enriched in $IF_7$ will have a higher concentration of $IF_7$ relative to the $IF_7$ concentration in the provided mixture from which it is produced according to the present methods, while a product enriched in HF will have a concentration of HF higher than the provided mixture. The term "azeotropic amount" refers to the amount of $IF_7$ or HF component in a provided mixture of $IF_7$ and HF necessary to make an azeotropic mixture with substantially all of the other HF or $IF_7$ component in the mixture.

In yet another embodiment, the present invention provides methods of producing a product enriched in HF from a mixture comprising $IF_7$ and HF, the method comprising: providing a mixture comprising HF and $IF_7$ in an amount less than the amount necessary to form an azeotrope with all of the HF present in the mixture; and removing an azeotrope-like composition of the present invention from the mixture to produce a product enriched in HF.

Azeotrope-Like Compositions

As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant-boiling and cannot be separated during a phase change.

The azeotrope-like compositions of the invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

It is well-recognized in the art that it is not possible to predict the formation of azeotropes. (See, for example, U.S. Pat. No. 5,648,017 (column 3, lines 64–65) and U.S. Pat. No. 5,182,040 (column 3, lines 62–63), both of which are incorporated herein by reference). In addition, it has been specifically reported that iodine pentafluoride ("$IF_5$") does not form an azeotrope with HF (M. Rogers, J. Speirs, M. Panish, and H. Thompson, *Journal of the American Chemical Society*, 78, 936 [1956]). Nevertheless, applicants have discovered unexpectedly that $IF_7$ and HF from azeotrope-like compositions.

According to certain preferred embodiments, the azeotrope-like compositions of the present invention comprise, and preferably consist essentially of, from about 1 to about 28 weight percent HF and from about 72 to about 99 weight percent $IF_7$, (unless otherwise specified, weight percents disclosed herein are based on the total weight of HF and $IF_7$). More preferably, the azeotrope-like compositions according to the present invention comprise from about 2 to about 24 weight percent HF and from about 76 to about 98 weight percent $IF_7$, and even more preferably from about 4 to about 20 weight percent HF and from about 80 to about 96 weight percent $IF_7$. A particularly preferred composition, the azeotropic composition, comprises about 10 weight percent HF and about 90 weight percent $IF_7$.

The azeotrope-like compositions described herein preferably have a boiling point of from about 5° C. to about 50° C. at a pressure of from about 18 psia to about 125 psia. In certain particularly preferred embodiments, the composition has a boiling point of about 28° C. at 53 psia.

The azeotrope-like compositions of the present invention can be produced in-situ in a variety of reactions and/or by combining effective amounts of $IF_7$ and HF to form azeotrope-like compositions. The term "effective amounts" as used herein refers to the amount of each component which upon combination with the other component, results in the formation of an azeotrope-like composition of the present invention.

Any of a wide variety of methods known in the art for combining two or more components to form a composition can be adapted for use in the present methods to produce an azeotrope-like composition. For example, $IF_7$ and HF can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

Uses of the Compositions

The compositions of the present invention may be used in a wide variety of applications, including as alternative fluorinating agents to $IF_7$ and/or $IF_5$. In addition, the compositions of the present invention are particularly suited for use in producing products enriched in either $IF_7$ or HF from mixtures of $IF_7$ and HF via methods comprising: providing a mixture comprising $IF_7$ and HF wherein one of the $IF_7$ or HF components is present in an amount less than the azeotropic amount; and removing an azeotrope-like composition of the present invention from the mixture to produce a product enriched in the other of the $IF_7$ or HF components.

The mixtures comprising $IF_7$ and HF may be provided from any of a number of sources according to the present invention. For example, mixtures comprising $IF_7$ and HF may be prepared manually or supplied from or in a reactor as a reaction product. In certain preferred embodiments, the provided mixture is a reaction product produced from an $IF_7$-forming reaction. Examples of suitable reaction products to be provided according to the present methods include those produced by the liquid or vapor phase reaction of $IF_7$-precursor compounds with elemental fluorine. The reaction products for use herein may be crude or treated $IF_7$-forming reaction products. As used herein, the term "crude $IF_7$-forming reaction product" refers to a product from an $IF_7$-forming reaction that contains $IF_7$, HF, as well as other unreacted starting materials, reaction intermediates, and/or reaction by-products. The term "treated $IF_7$-forming reaction product", as used herein, refers to the product of an $IF_7$-forming reaction that has been treated to remove at least a portion of the unreacted starting materials, reaction intermediates, and/or by-products. Those of skill in the art will recognize that any of a wide range of methods for removing such compounds from the reaction product including, for example, distillation, water or caustic scrubbing, drying, combinations thereof, and the like, may be used.

As noted above, the provided mixture comprises $IF_7$ and HF wherein either the $IF_7$ or HF is present in less than the azeotropic amount. In embodiments wherein a product enriched in $IF_7$ is desired, the provided mixture comprises an amount of HF less than the azeotropic amount. In embodiments wherein a product enriched in HF is desired, the provided mixture comprises an amount of $IF_7$ less than the azeotropic amount. In certain preferred embodiments wherein a product enriched in $IF_7$ is desired, the amount of HF present in the provided mixture is less than about 10 weight percent HF, preferably less than about 7 weight percent, and even more preferably less than about 4 weight percent, the weight percent being based on the total weight of $IF_7$ and HF in the mixture. In certain preferred embodiments wherein a product enriched in HF is desired, the amount of $IF_7$ present in the provided mixture is less than about 90 weight percent, preferably less than about 70 weight percent, and even more preferably less than about 50 weight percent, the weight percent being based on the total weight of $IF_7$ and HF in the mixture.

Any of a wide range of methods for removing an azeotrope-like composition of the present invention from the provided mixture are suitable for use herein. Examples of suitable methods for removing an azeotrope-like composition include distillation, extraction, phase separation, combinations of two or more thereof, and the like. In certain preferred embodiments, the azeotrope-like composition is removed via distillation.

Any of a wide range of conventional distillation methods and distillation apparatus may be used in the methods of the present invention. Examples of suitable distillation methods include single or multi-stage distillations performed as either continuous or batch operations. Examples of suitable apparatus include, columns with trays, packed columns, combinations of two or more thereof, and the like.

The conditions under which distillation is carried out is readily determinable by one of skill in the art, based on the disclosure herein. In preferred embodiments, the distillation may be carried out at pressures of up to about 200 psi. In certain more preferred embodiments, distillation is carried out at a pressure of from about 5 to about 150 psi.

In light of the disclosure herein, those of skill in the art will be readily able to produce a product enriched in either $IF_7$ or HF from a mixture comprising $IF_7$ and HF without undue experimentation.

According to other preferred embodiments, the present invention provides methods for removing HF and/or $IF_7$ from a mixture comprising a desired compound in addition to HF, $IF_7$, or a combination of the two. The preferred methods comprise providing a mixture comprising a compound selected from the group consisting of HF, $IF_7$, and combinations thereof; adding an amount of HF or $IF_7$ to said provided mixture effective to form an azeotrope-like composition of the present invention, and distilling said mixture to remove said azeotrope-like composition.

The mixtures of the present methods may be provided in any manner disclosed herein above. In certain preferred embodiments, the provided mixture is a reaction product containing a reaction target compound, as well as, HF and/or $IF_7$. For example, in certain preferred embodiments, the provided mixture is a reaction product of an $IF_5$-forming reaction. By using the methods of the present invention, HF and/or $IF_7$ impurities can be effectively removed from a desired $IF_5$ (or other) reaction product.

The step of adding HF or $IF_7$ to the provided mixture and the removal step may be conducted according to the disclosure hereinabove and according to methods known in the art. In light of the disclosure herein, those of skill in the art will be readily able to remove HF and/or $IF_7$ from a provided mixture according to the present methods without undue experimentation.

EXAMPLES

Example 1

Crude iodine heptafluoride (714 g) and HF (50 g) are mixed at about 19° C. to give a pressure of about 35 psia. This pressure is higher than either of the two components, thus demonstrating existence of an azeotrope.

Example 2

Crude iodine heptafluoride (711 g) and HF (48 g) are mixed at about 20.3° C. to give a pressure of about 35.7 psia. This pressure is higher than either of the two components, thus demonstrating existence of an azeotrope.

Example 3

A mixture comprising iodine heptafluoride (278 g), a small amount of HF, and 851 grams of a mixture (approximately 25% iodine heptafluoride and 75% iodine pentafluoride) was distilled. The temperature and vapor pressure during distillation were measured and the composition of the distilled vapor phase was determined by Fourier transform infrared spectroscopy. The constant azeotropic or azeotrope-like composition of the overhead stream was about 10 wt % HF and about 90 wt % iodine heptafluoride. The boiling point of this azeotropic composition is plotted, along with the boiling points of HF (about 60° C.) and iodine heptafluoride (about 34° C.) at about 53 psia in FIG. 1. From this figure it is observed that the boiling point of the distilled $HF-IF_7$ mixture is lower than the boiling point of each individual component.

What is claimed is:

1. An azeotrope-like composition comprising iodine heptafluoride ($IF_7$) and hydrogen fluoride (HF).

2. An azeotrope-like composition according to claim 1 comprising from about 1 to about 28 weight percent HF and from about 72 to about 99 weight percent $IF_7$, based on the total weight of HF and $IF_7$.

3. An azeotrope-like composition according to claim 2 comprising from about 2 to about 24 weight percent HF and from about 76 to about 98 weight percent $IF_7$.

4. An azeotrope-like composition according to claim 3 comprising from about 4 to about 20 weight percent HF and from about 80 to about 96 weight percent $IF_7$.

5. An azeotrope-like composition according to claim 1 comprising about 10 weight percent HF and about 90 weight percent $IF_7$.

6. An azeotrope-like composition of claim 5 having a boiling point of about 28° C. at about 53 psia.

7. An azeotrope-like composition of claim 1 having a boiling point of from about 5° C. to about 50° C. at a pressure of from about 18 psia to about 125 psia.

8. A method for producing an azeotrope-like composition comprising combining $IF_7$ and HF in amounts effective to produce an azeotrope-like composition.

9. The method of claim 8 comprising mixing from about 1 to about 28 weight percent HF and from about 72 to about 99 weight percent $IF_7$, the weight percents being based on the total weight of HF and $IF_7$.

10. A method of producing a product enriched in $IF_7$ or HF from a mixture comprising $IF_7$ and HF comprising:
    providing a mixture comprising $IF_7$ and HF wherein one of the $IF_7$ or HF components is present in an amount less than the azeotropic amount; and
    removing an azeotrope-like composition from the mixture to produce a product enriched in the other of the $IF_7$ or HF components.

11. The method of claim 10 wherein the provided mixture comprises HF in an amount less than the azeotropic amount and an azeotrope-like composition is removed to produce a product enriched in $IF_7$.

12. The method of claim 11 wherein said provided mixture comprises HF in an amount of less than about 10 weight percent, based on the total amount of HF and $IF_7$ in the provided mixture.

13. The method of claim 11 wherein said azeotrope-like composition is distilled from said provided mixture.

14. The method of claim 10 wherein the provided mixture comprises $IF_7$ in an amount less than the azeotropic amount and an azeotrope-like composition is removed to produce a product enriched in HF.

15. The method of claim 14 wherein said provided mixture comprises $IF_7$ in an amount of less than about 90 weight percent, based on the total amount of HF and $IF_7$ in the provided mixture.

16. The method of claim 14 wherein said azeotrope-like composition is distilled from said provided mixture.

17. A method for removing a compound selected from the group consisting of HF, $IF_7$, and combinations thereof from a mixture, said method comprising:
    providing a mixture comprising a compound selected from the group consisting of HF, $IF_7$, and combinations thereof;
    adding an amount of HF or $IF_7$ to said provided mixture effective to form an azeotrope-like composition of the present invention; and
    distilling said mixture to remove said azeotrope-like composition.

* * * * *